UNITED STATES PATENT OFFICE.

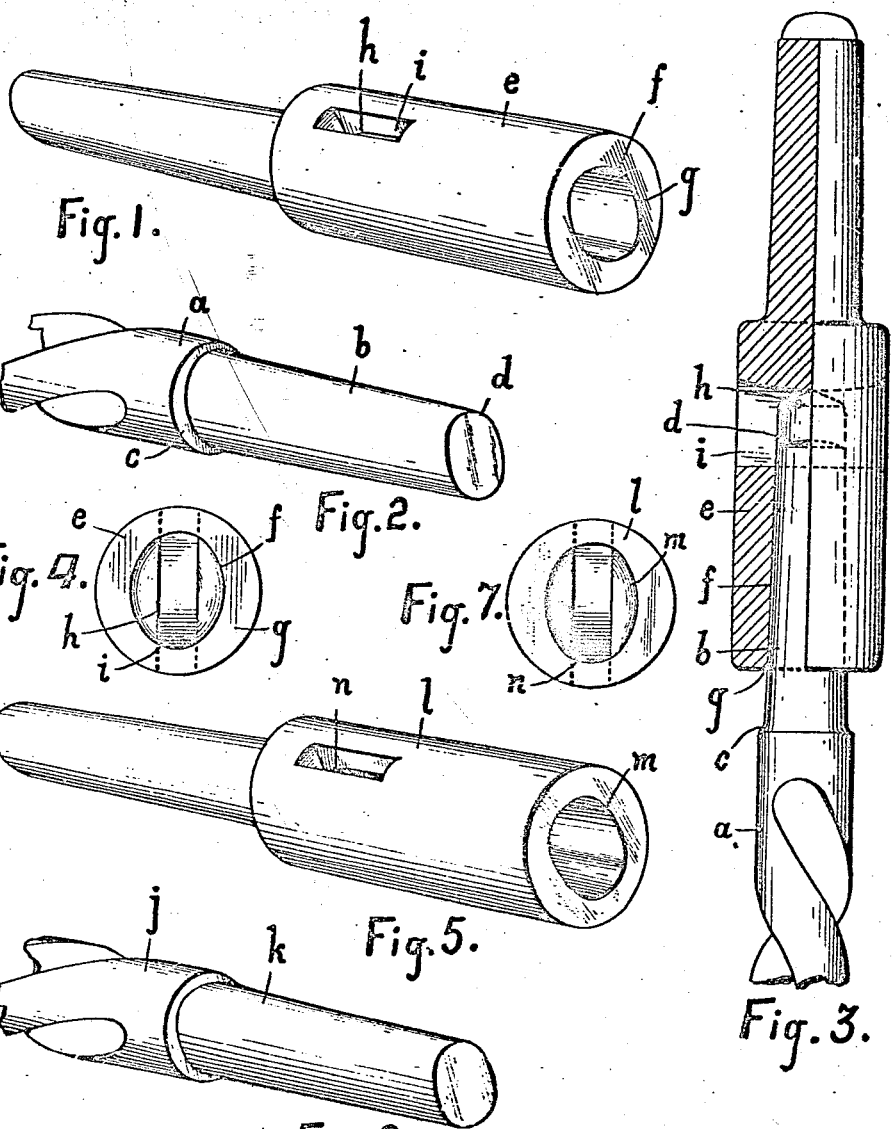

HENRY DERRER, OF SAULT STE. MARIE, ONTARIO, CANADA.

DRILL AND SOCKET THEREFOR.

No. 895,244.     Specification of Letters Patent.     Patented Aug. 4, 1908.

Application filed February 7, 1906. Serial No. 299,984.

*To all whom it may concern:*

Be it known that I, HENRY DERRER, a subject of the King of Great Britain, residing in the town of Sault Ste. Marie, in the Province of Ontario, in the Dominion of Canada, have invented certain new and useful Improvements in Drills and Sockets Therefor, of which the following is a specification.

The invention relates to improvements in drills and sockets therefor, as described in the present specification and illustrated by the accompanying drawings that form part of the same.

The invention consists essentially of a drill having a shank of ovalescent formation in cross section and tapering from its lower end to the extremity thereof and a socket having a hole correspondingly formed and adapted to receive said drill shank.

The object of the invention is to obviate the difficulties incident to the turning of drills in their sockets and thus increase the efficiency of the drill and the durability of the parts.

In the drawings, Figure 1 is a perspective view of a socket having the hole of elliptical formation. Fig. 2 is a perspective view of a drill broken away showing the shank of elliptical formation corresponding to said hole and tapered towards the extremity thereof. Fig. 3 is a view partially in section showing the parts illustrated in Figs. 1 and 2 assembled. Fig. 4 is a plan view of the drill socket shown in Fig. 1, from below. Fig. 5 is a perspective view of a drill socket having its hole formed in a slightly different shape from that shown in Fig. 1. Fig. 6 is a perspective view of a drill broken away having its shank formed to correspond with the shape of the hole in the socket illustrated in Fig. 5. Fig. 7 is a plan view of the socket, illustrated in Fig. 5, from below.

Like letters of reference indicate corresponding parts in each figure.

Referring to the drawings, $a$ is the drill and $b$ is the shank forming part therewith and rising from said main drill portion, on which is formed the shoulder $c$. The periphery of the drill $a$ reaching downwardly from the shoulder $c$ to the cutting edges is circular, and the shank $b$ rising from the drill portion $a$ is of the elliptical formation in cross section and tapers from the shoulder $c$ to the extremity $d$.

$e$ is the socket having the longitudinal hole $f$ elliptically formed and tapered from its outer end $g$ to its inner terminus $h$ and corresponding to the shape of the said shank $b$.

$i$ is a lateral opening leading through the socket wall and into the hole $f$ at the top end thereof, and is for the purpose of driving the said drill out with a suitable wedge, as the shank $b$ is so formed as to abut the wall of the hole, before the extremity of the said shank reaches the inner terminus $h$ of the hole.

In Figs. 5, 6 and 7, $j$ is a drill having a shank $k$ in which the only difference noticeable in the shank of the drill $a$, is that the sides of the elliptical formation shown in cross section are compressed, so that the appearance is more that of a rectangular formation having the corners rounded off.

$l$ is a socket for the said drill $k$ and has its hole $m$ correspondingly formed to receive the drill shank $k$, and also has the hole $n$ leading through the wall of said socket into the hole thereof at the top end for the same purpose, as described in the drill illustrated in Figs. 1 and 2.

The advantages of this drill are obvious to those familiar with the use of such tools, as a proper socket, which will prevent the turning of the drill therein and yet be of simple and durable construction, has been a difficult problem, and while many devices are already known to overcome this trouble, none so far seems to be of the simple ovalescent formation combined with a tapered shank. This oval or elliptical form of shank and socket enables the provision of a cutting tool or drill having a tangless, turned shank, in which the shank may be gripped throughout every part thereof that extends into the socket so that the strain thereon will be distributed over the whole area of such shank.

What I claim as my invention is:

1. A socket fitting cutting tool or drill having a shank of oval form in cross section, substantially as described.

2. A socket fitting cutting tool or drill having a tapered shank elliptical in cross section, substantially as described.

3. A combined holder and cutting tool or drill comprising a socketed member having a tapered oval socket of symmetrical form in cross-section and a cutting tool or drill having a shank of oval form in cross section and increasing symmetrically from the end toward the body of the tool to form a tapered shank corresponding to the form of the socket in the holder and gripped by said holder throughout the entire area of said shank so that the strain thereon is distributed over the whole area of said shank.

Signed at Sault Ste. Marie, Ontario this 1st day of February 1906.

HENRY DERRER.

Witnesses:
 JNO. A. MCSHAW,
 G. S. WISNER.